United States Patent [19]
Daubenberger et al.

[11] 3,964,509
[45] June 22, 1976

[54] CHECK VALVE

[75] Inventors: Charles B. Daubenberger; Charles J. Daubenberger, both of Van Nuys, Calif.

[73] Assignee: Da/Pro Rubber, Inc., Van Nuys, Calif.

[22] Filed: Feb. 14, 1975

[21] Appl. No.: 549,988

[52] U.S. Cl. ............................ 137/525.1; 222/490
[51] Int. Cl.² ........................................ F16K 15/14
[58] Field of Search ............. 137/525.1, 525.3, 525; 222/490, 44, 24.5, 90

[56] References Cited
UNITED STATES PATENTS

| | | | |
|---|---|---|---|
| 490,904 | 1/1893 | Gray | 137/525.1 X |
| 2,417,968 | 3/1947 | Browne | 137/525.1 |
| 3,621,876 | 11/1971 | Campbell | 137/525.1 |

FOREIGN PATENTS OR APPLICATIONS

| | | | |
|---|---|---|---|
| 645,340 | 11/1950 | United Kingdom | 137/525.1 |

Primary Examiner—Martin P. Schwadron
Assistant Examiner—Robert J. Miller
Attorney, Agent, or Firm—Ralph B. Pastoriza

[57] ABSTRACT

The check valve comprises an integral body of elastomeric material of generally exterior hemispherical shape with an annular flange portion on the base of the hemisphere. An inlet passage is formed in the base and terminates within the hemispherical portion, there being provided a cut from the end of the inlet passage to the outer periphery of the hemispherical portion defining a slit of given dimensions. This slit is formed at an acute angle to the plane of the base of the hemisphere; that is, the plane normal to the axis of the inlet passage. The geometry of the configuration is such that the slit will open to pass fluid either liquid or gas from the inlet to the exterior of the body when a differential pressure of the fluid across the body is exceeded and collapse or close when the differential pressure reverses to block reverse flow of fluid through the body.

3 Claims, 6 Drawing Figures

U.S. Patent June 22, 1976 3,964,509

CHECK VALVE

This invention relates to fluid valves and more particularly to a fluid check valve of integral construction wherein the opening and closing of the valve is automatically controlled by the differential pressure across the valve.

BACKGROUND OF THE INVENTION

Fluid check valves in general are well known in the art and generally are of two types. The first type incorporates a valve seat and ball or valve headed stem spring-biased against the seat to a closed position, the same being forced open when a given differential pressure across the valve is exceeded. When this differential pressure decreases or reverses, the ball or valve stem head will seat on the valve seat and block reverse flow.

The second types of fluid check valves are generally of an integral construction of elastomeric material, shaped to define a lip or flap which will open when a given differential pressure across the body is exceeded and close when this differential pressure reverses.

One of the problems with the second type of valve described above is its tendency to flutter when the pressure differentials fall within certain ranges. Accordingly, efforts have been made to attempt to control such flutter by utilizing different types of elastomeric material; that is, material having different elastic properties. However, there are only certain elastomeric materials which can be molded and serve satisfactorily for such valves and thus in some instances it has been necessary to resort to the first type of valves described above which are more expensive to manufacture.

BRIEF DESCRIPTION OF THE PRESENT INVENTION

With the foregoing considerations in mind, the present invention contemplates an improved automatic fluid check valve of the second type, wherein an integral body of elastomeric material is utilized but wherein the problem of flutter is avoided in those pressure differential ranges which resulted in flutter with prior art types of integrally formed valves.

More particularly, rather than attempt to change the valve characteristics by utilizing different types of materials of different elasticity, we have discovered that the valve characteristics can be adjusted to avoid flutter within given differential pressure ranges by adjusting the actual geometry of the valve structure itself.

In a preferred embodiment of the invention, the integral body of elastomeric material is provided with an externally shaped portion substantially that of a hemisphere of a given radius. An inlet passage is formed passing into the base of the hemisphere to terminate in a normally closed inner end. At this inner end, there is provided a cut through to the outer forward periphery of the hemisphere to define a slit at a given acute angle to the plane of the base of the hemisphere which plane is normal to the axis of the inlet passage. Further, this cut or slit is provided with a given transverse dimension and a given length measured from the interior to the outer periphery of the hemisphere. Adjustment of the wall thickness of the hemisphere defined between the inlet passage and its exterior, the angle of the slit, the length of the slit through the wall of the hemisphere, and its transverse dimension all enable operation of the valve to function without flutter for given differential pressure ranges.

BRIEF DESCRIPTION OF THE DRAWINGS

A better understanding of this invention will be had by referring to the accompanying drawings in which.

DETAILED DESCRIPTION OF THE PREFERRED EMBODIMENT

Figure 1:
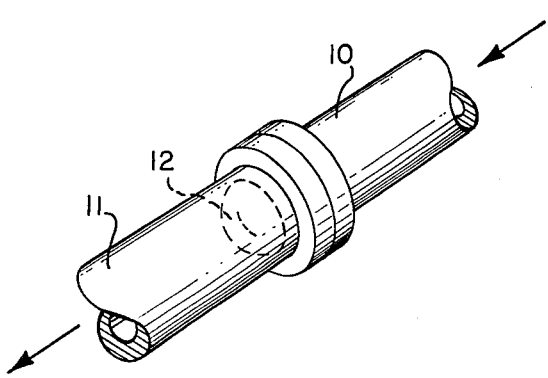
FIG. 1 is a fragmentary perspective view of a fluid piping system wherein the check valve of the present invention might be incorporated.

Referring first to FIG. 1 there are shown fluid pipes 10 and 11 incorporating a check valve 12 at their connecting points for passing fluid from the pipe 10 out of the pipe 11 and blocking flow of fluid in a reverse direction. In this respect, the fluid may be either liquid or gas.

Figure 2:
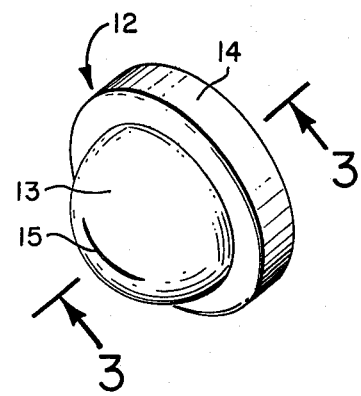
FIG. 2 is an enlarged perspective view of the check valve used in the piping system of FIG. 1 in accord with the present invention.

Referring to FIG. 2, the check valve 12 comprises a single integral body of an elastomeric material having an externally shaped portion substantially that of a hemisphere 13. In the embodiment illustrated, the integral body 12 also includes an annular flange portion 14 integrally formed on the base of the hemispherical portion 13, the annular flange 14 serving as a securing means for supporting the check valve such as in the piping system of FIG. 1.

As shown in FIG. 2, there is provided a slit 15 in the front exterior portion of the hemisphere 13. This slit is arranged to open to pass fluid in one direction; that is, from the rear through the body out the front of the hemisphere and collapse to block reverse flow.

Figure 3:
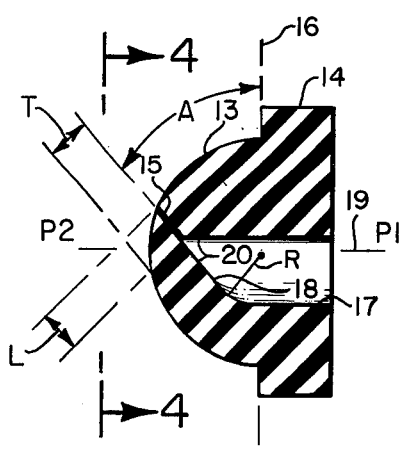
FIG. 3 is a cross section of the check valve taken in the direction of the arrows 3—3 of FIG. 2 showing the valve in closed position.

Referring now to the cross section of FIG. 3, further details are shown. In FIG. 3, the vertical dashed line 16 represents the plane of the base of the hemisphere 13 wherein the annular flange 14 is integrally formed. In the rear portion of the base and annular flange, there is provided an inlet passage 17 which terminates at a normally closed inner end 18. The geometry of this inlet passage 17 defines with an exterior portion of the hemisphere 13 a given wall thickness designated T in FIG. 3. The axis of the main portion of the inlet passage 17 is designated by the dashed line 19 which axis is normal to the plane 16. The radius of the hemisphere 13 is designated R.

It will be noted that the slit 15 constitutes a cut from the inner end of the inlet passage 17 through to the outer forward periphery of the hemisphere 13, the defined slit being at a given acute angle A to the plane 16. It will also be noted that the inner end of the passage 18 terminates in a V-shape 20, the vertex of the V defining an angle equal to the given acute angle A. The slit 15 initiates at the vertex of the V-shape 20 and as a consequence, its length measured from the interior to the outer periphery of the hemisphere and designated L in FIG. 3 is less than the wall thickness T.

Figure 4:
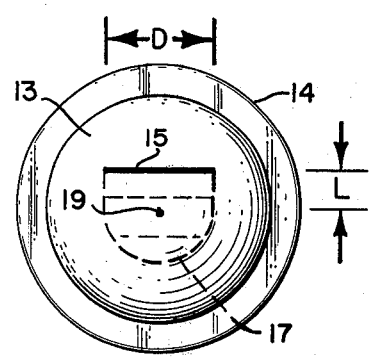
FIG. 4 is a front elevational view taken in the direction of the arrows 4—4 of FIG. 3.

Referring to the front elevational view of FIG. 4, the transverse dimension of the slit 15 is indicated at D. In FIG. 4, the dimension L is again given as measured between the outer end of the slit 15 and the dotted line showing of FIG. 4 representing the vertex of the V-shape 20 of FIG. 3.

In FIGS. 3 and 4, the valve is shown in its closed position there being indicated in FIG. 3 an inlet pressure P1 and an exterior pressure on the other side of the valve of P2. When the differential pressure; that is, the amount by which the pressure P1 exceeds the pressure P2, exceeds a given value, the slit 15 will be forced open so that fluid can pass through the inlet passage 17 to the exterior of the hemispherical portion 13.

Figure 5:
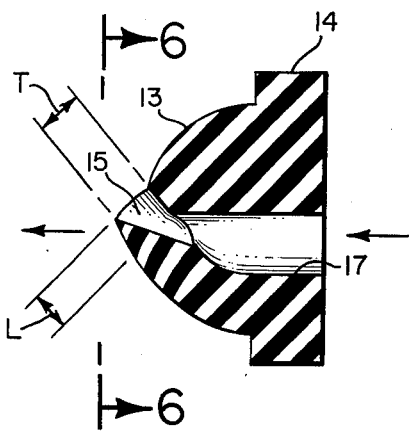
FIG. 5 is a cross-section showing the valve in its open position.

FIG. 5 illustrates in a cross section similar to FIG. 3 the slit 15 in its open position as a consequence of the differential pressure exceeding the referred to given value.

Figure 6:
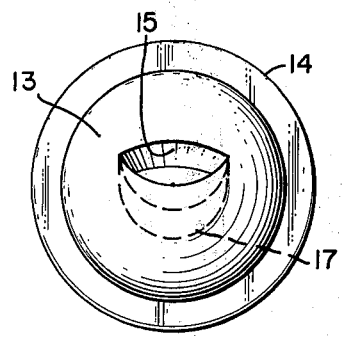
FIG. 6 is a front elevational view taken in the direction of the arrows 6—6 of FIG. 5.

FIG. 6 shows the appearance of the open slit 15 looking at the front of the valve.

OPERATION

It will be appreciated that when the integral elastomeric body making up the valve as described is inserted in a fluid piping system such as shown in FIG. 1, it will function as a check valve, fluid passing through the inlet 17 exiting through the slit 15 when a predetermined differential pressure has been exceeded. When this differential pressure reverses, the slit 15 will collapse or close, thus blocking flow of fluid in a reverse direction.

It will also be evident from an inspection of FIG. 3 that the exterior pressure P2 acts across the contact length L of the slit as well as the transverse dimension D of the slit, the latter dimension being shown in FIG. 4. There is thus defined by the dimensions L and D a given contact area of the slit in its closed position over which the external pressure P2 is applied.

It can immediately be appreciated that by decreasing the dimension L this contact area is decreased and thus the given differential pressure which must be exceeded to open the slit may be decreased. On the other hand, decreasing the transverse dimension D will tend to lend a greater stiffness to the slit, thus requiring a greater differential pressure to open the same. Moreover, the angle A at which the slit is formed relative to the plane 16 affects the differential pressure necessary to open the slit and pass fluid and finally, the wall thickness T affects this value of differential pressure. Thus, it will be clear that by increasing the wall thickness T, there is imparted a greater stiffness to the slot portion which must be urged away from the upper solid hemispherical portion of the valve along its contact area.

From all of the foregoing, it will be evident that the valve can be made to operate effectively and in fact does operate effectively without flutter by adjusting the foregoing geometrical dimensions which will vary the range of differential pressures over which the valve can function properly. Further, it should be understood that this control of the action of the valve is effected without having to in any way alter the physical material making up the valve body.

In its broadest aspects, the relative dimensions T, A, D, and L relative to the radius R of the hemispherical portion of the valve can be adjusted within limits as follows:

$$.125R < T < .75R$$
$$20° < A < 50°$$
$$.25R < D < 1.25R, \text{ and}$$
$$.0625R < L < .375R$$

In a preferred embodiment of the invention, the foregoing dimensions relative to R are within the following limits:

$$.2R < T < .3R$$
$$30° < A < 45°$$
$$.5R < D < .7R$$
$$.1R < L < .2R$$

From the foregoing description, the present invention has thus provided an improved automatic check valve of the type constituting a single integral elastomeric body wherein the desired action of the valve without flutter can be realized by altering the geometry as described as opposed to having to change the physical material making up the body.

What is claimed is:

1. A check valve, comprising:
 a single integral body of an elastomeric material having an externally shaped portion substantially that of a hemisphere of given radius R, and an inlet passage passing into the base of the hemisphere and terminating in a normally closed inner end to define a wall thickness to the exterior of said hemisphere of a given value T, said inner end being cut through to the outer forward periphery of the hemisphere to define a slit at a given acute angle A to a plane normal to the axis of the inlet passage, said slit having a given transverse dimension D and a given length L measured from the interior to the outer periphery of said hemisphere, the inner end of said inlet passage terminating in a V-shape, the vertex of the V defining an angle equal to said given acute angle, said Slit initiating at the vertex of said V, and wherein:

$$.125R < T < .75R$$
$$20° < A < 50°$$
$$.25R < D < 1.25R, \text{ and}$$
$$.0625R < L < .375R$$

whereby when fluid pressure across the hemisphere between said inlet passage and the exterior exceeds a given differential value, said slit will be opened to pass fluid from the interior to the exterior, said slit closing when the differential pressure reverses to block any reverse flow of fluid through said body.

2. A check valve according to claim 1 in which said body includes an annular flange portion integrally formed on the base of said hemispherical portion, said annular flange portion serving as a securing means for said check valve.

3. A check valve according to claim 1, in which:

$$.2R < T < .3R$$
$$30° < A < 45°$$
$$.5R < D < .7R$$
$$.1R < L < .2R$$

* * * * *